(12) United States Patent
Ikeda

(10) Patent No.: US 8,698,948 B2
(45) Date of Patent: Apr. 15, 2014

(54) IMAGE PICKUP APPARATUS AND CONTROL METHOD CONFIGURED TO PROVIDE EXPOSURE CONTROL

(75) Inventor: Takeshi Ikeda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 583 days.

(21) Appl. No.: 12/616,539

(22) Filed: Nov. 11, 2009

(65) Prior Publication Data

US 2010/0123795 A1 May 20, 2010

(30) Foreign Application Priority Data

Nov. 20, 2008 (JP) ................. 2008-296245

(51) Int. Cl.
*H04N 5/238* (2006.01)
*H04N 5/228* (2006.01)

(52) U.S. Cl.
USPC ........................................ 348/364; 348/222.1

(58) Field of Classification Search
USPC .................................................. 348/362–365
See application file for complete search history.

(56) References Cited

U.S. PATENT DOCUMENTS

| | | | | |
|---|---|---|---|---|
| 5,703,644 | A * | 12/1997 | Mori et al. | 348/363 |
| 5,818,975 | A * | 10/1998 | Goodwin et al. | 382/274 |
| 7,298,412 | B2 * | 11/2007 | Sannoh et al. | 348/348 |
| 7,683,964 | B2 * | 3/2010 | Okuno | 348/364 |
| 7,796,831 | B2 * | 9/2010 | Tanaka | 382/274 |
| 7,847,830 | B2 * | 12/2010 | Rogers et al. | 348/222.1 |
| 7,884,879 | B2 * | 2/2011 | Miyazaki | 348/364 |
| 7,948,524 | B2 * | 5/2011 | Endo et al. | 348/222.1 |
| 7,970,271 | B2 * | 6/2011 | Sugimoto | 396/153 |
| 7,973,853 | B2 * | 7/2011 | Ojima et al. | 348/364 |
| 7,990,465 | B2 * | 8/2011 | Yamashita et al. | 348/365 |
| 8,081,236 | B2 * | 12/2011 | Tsuruoka | 348/229.1 |
| 8,144,214 | B2 * | 3/2012 | Yamashita et al. | 348/229.1 |
| 8,194,153 | B2 * | 6/2012 | Asoma | 348/229.1 |
| 8,237,853 | B2 * | 8/2012 | Takahashi | 348/364 |
| 8,285,135 | B2 * | 10/2012 | Shih et al. | 396/234 |
| 2007/0177050 | A1 * | 8/2007 | Xiao et al. | 348/371 |
| 2010/0020194 | A1 * | 1/2010 | Hirooka | 348/229.1 |

FOREIGN PATENT DOCUMENTS

JP 2003-107555 4/2003

* cited by examiner

*Primary Examiner* — Ngoc-Yen Vu
(74) *Attorney, Agent, or Firm* — Cowan, Liebowitz & Latman, P.C.

(57) ABSTRACT

An image pickup apparatus includes an object detection unit configured to detect an object, a brightness value acquisition unit configured to obtain a brightness value of each division region of an object field, an object photometric-value generation unit configured to generate a photometric value of the object from information of the object and a brightness value of each division region, a region selection unit configured to select a high brightness region, and an exposure-control photometric-value generation unit configured to generate a photometric value used for an exposure control from a photometric value of the object and a photometric value of the high brightness region.

16 Claims, 3 Drawing Sheets

IMAGE PICKUP APPARATUS AND CONTROL METHOD CONFIGURED TO PROVIDE EXPOSURE CONTROL

BACKGROUND OF THE INVENTION

1. Field of the Invention

The present invention relates to an image pickup apparatus, and more particularly to an image pickup apparatus configured to provide exposure control using a detection result of an object.

2. Description of the Related Art

Recent digital cameras are mounted with the face recognition technology as part of the object recognition. This technology is effective to an automatic recognition of a main object in an image to be photographed, and proper photography of the main object. For example, when a human exists in an object field and turns his face on a camera, his face is recognized by the face recognition function and determined to be a main object. Accordingly, the camera provides such automatic focus, white balance, exposure controls that the recognized face can be properly photographed. Japanese Patent Laid-Open No. ("JP") 2003-107555 proposes a digital camera configured to generate a photometric value used for the exposure control by weighing a photometric value of a face recognition part and a photometric value of the entire object field.

Once the main face is determined in the face recognition, JP 2003-107555 provides automatic exposure on the basis of the main face and may not provide exposure control pursuant to the photographer's intent when the main face is not located at the photometric center. For instance, some recent digital cameras have a photography mode (spotlight mode) used to properly photograph a spotlighted object. In the spotlight mode, the high brightness region in the object field is searched and its region is properly exposed. Hence, when the main face is automatically exposed in the spotlight mode and there is no main face in the high brightness region, the high brightness region is excessively bright and a face other than the recognized main face in the brightness region is not properly exposed.

SUMMARY OF THE INVENTION

The present invention provides an image pickup apparatus that can photograph with proper exposure an object in a high brightness area.

An image pickup apparatus according to one aspect of the present invention includes an image pickup device configured to convert incident light from a lens into an electric signal, an object detection unit configured to detect an object by extracting a characteristic point of an image based on an output of the image pickup device, a brightness value acquisition unit configured to obtain a brightness value of each division region of an object field that is divided into a plurality of division regions, an object photometric-value generation unit configured to generate a photometric value of the object from information of the object detected by the object detection unit and the brightness value of each division region obtained by the brightness acquisition unit, a region selection unit configured to select a high brightness region having a brightness value equal to or higher than a threshold in the object field, and an exposure-control photometric-value generation unit configured to generate a photometric value used for an exposure control from a photometric value of the object generated by the object photometric-value generation unit and a photometric value of the high brightness region generated by the region photometric-value generation unit. When the object detection unit detects a first object in the high brightness region, and a second object in a low brightness region that is lower in brightness than the high brightness region and other than the high brightness region, the exposure-control photometric-value generation unit uses the photometric value of the high brightness region generated by the region photometric-value generation unit and the photometric value of the first object generated by the object photometric-value generation unit to generate the photometric value used for the exposure control but without using the photometric value of the second object generated by the object photometric-value generation unit.

Further features of the present invention will become apparent from the following description of exemplary embodiments with reference to the attached drawings.

DESCRIPTION OF THE EMBODIMENTS

Figure 1:
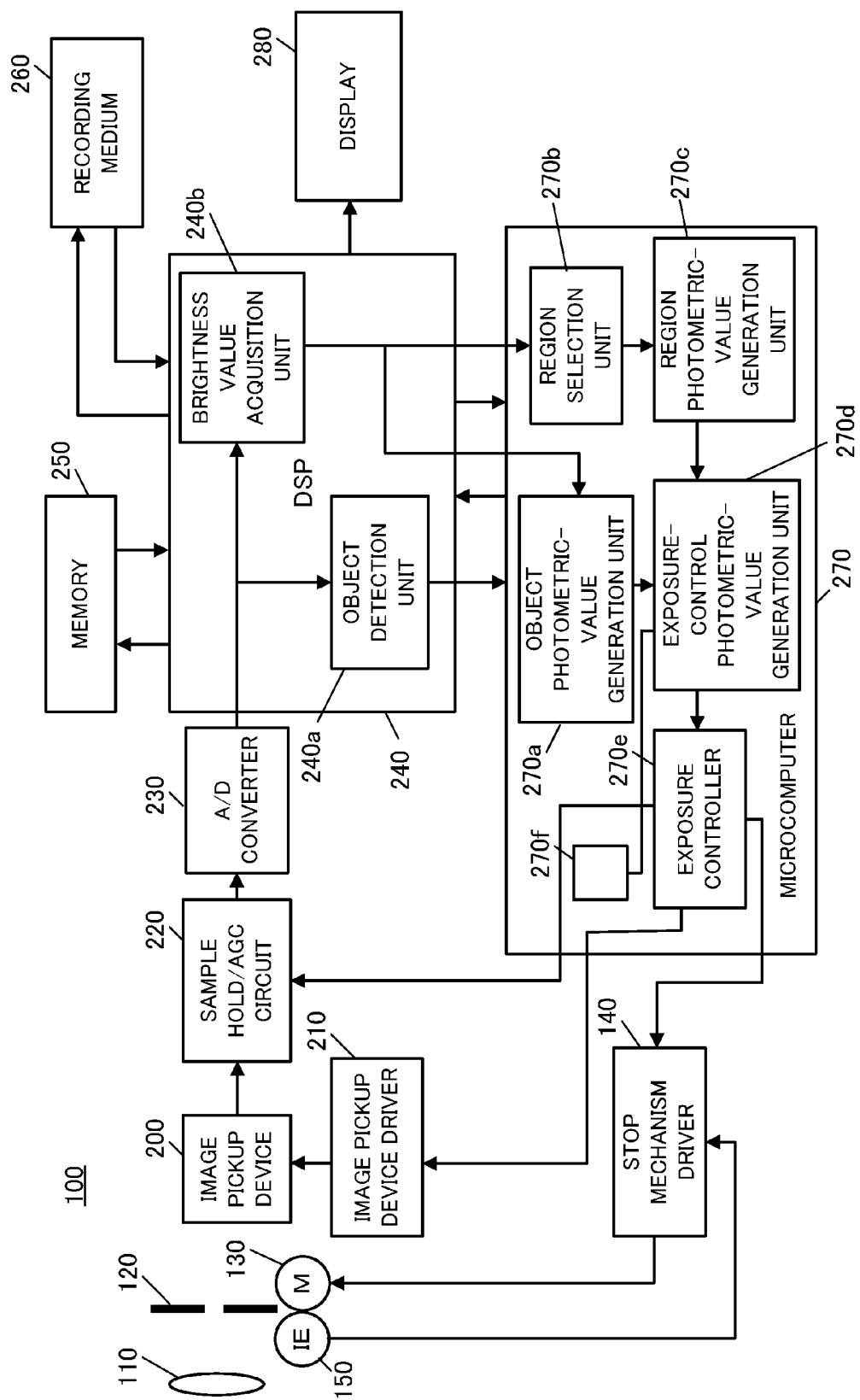
FIG. 1 is a block diagram of a digital camera (image pickup apparatus).

FIG. 1 is a block diagram of a digital camera (image pickup apparatus) according to one embodiment of the present invention.

Reference numeral 110 denotes a lens used to image an object. Reference numeral 120 denotes a stop mechanism configured to control an incident light quantity. Reference numeral 130 denotes a stop driving motor configured to drive the stop mechanism 120. Reference numeral 140 denotes a stop mechanism driver configured to drive the stop driving motor 130. Reference numeral 150 denotes a stop state detector configured to detect a state of the stop mechanism 120.

Reference numeral 200 denotes an image pickup device configured to (photoelectrically) convert the incident light from the imaging lens 110 into an electric signal. Reference numeral 210 denotes an image pickup device driver configured to control the image pickup device 200, to read out the photoelectrically converted signal, and to control a so-called electronic shutter function that controls a signal accumulating time period. Reference numeral 220 denotes a sample-and-hold/AGC circuit configured to sample the signal photoelectrically converted by the image pickup device 200, and to electrically amplify the resultant signal. Reference numeral 230 denotes an analogue to digital ("A/D") converter configured to convert an analogue signal as an output of the sample-and-hold/AGC circuit 220 to a digital signal.

Reference numeral 240 denotes a digital signal processor ("DSP") that has a control function configured to generate a standard television signal in addition to a synchronization signal after a gamma correction and other processes, such as a color separation and a color difference matrix. Reference numeral 240a denotes an object detection unit configured to detect an object (face) in an image by extracting a characteristic point based on digital data from the A/D converter 230. Reference numeral 240b denotes a brightness value acquisition unit configured to acquire a brightness value of a field, and to obtain a brightness average value of the entire field and a brightness average value for each of a plurality of division regions.

Reference numeral 250 denotes a memory configured to store an image processed by the DSP 240. Reference numeral 260 denotes a recording medium configured to record a motion image and a still image.

Reference numeral 270 denotes a microcomputer configured to issue a processing instruction to the DSP 240. Reference numeral 280 denotes a display configured to display an image. Reference denotes 270a denotes an object photometric-value generation unit configured to generate a photometric value of an object detected by the object detection unit 240a from object information detected by the object detection unit 240a and the brightness value obtained by the brightness value acquisition unit 240b. Reference numeral 270b denotes a region selection unit configured to automatically select a brightness region that is a certain constant brightness region, based on the brightness value obtained by the brightness value acquisition unit 240b. Reference numeral 270c denotes a region photometric-value generation unit configured to generate a photometric value of a region selected by the region selection unit 270b. Reference numeral 270d denotes an exposure-control photometric-value generation unit configured to generate a photometric value used for the exposure control from both the photometric value of the object generated by the object photometric-value generation unit 270a and the photometric value of a selected region generated by the region photometric-value generation unit 270c. Reference numeral 270e denotes an exposure controller configured to control exposure based on an output of the exposure-control photometric-value generation unit 270d. The exposure controller 270e determines which of the stop mechanism 120, the electronic shutter, and the AGC is to be operated, and issues an instruction to the stop mechanism driver 140, the image pickup device driver 210, the sample-and-hold/AGC circuit 220. Reference numeral 270f denotes a timer configured to measure a set time (period) T.

Figure 2:
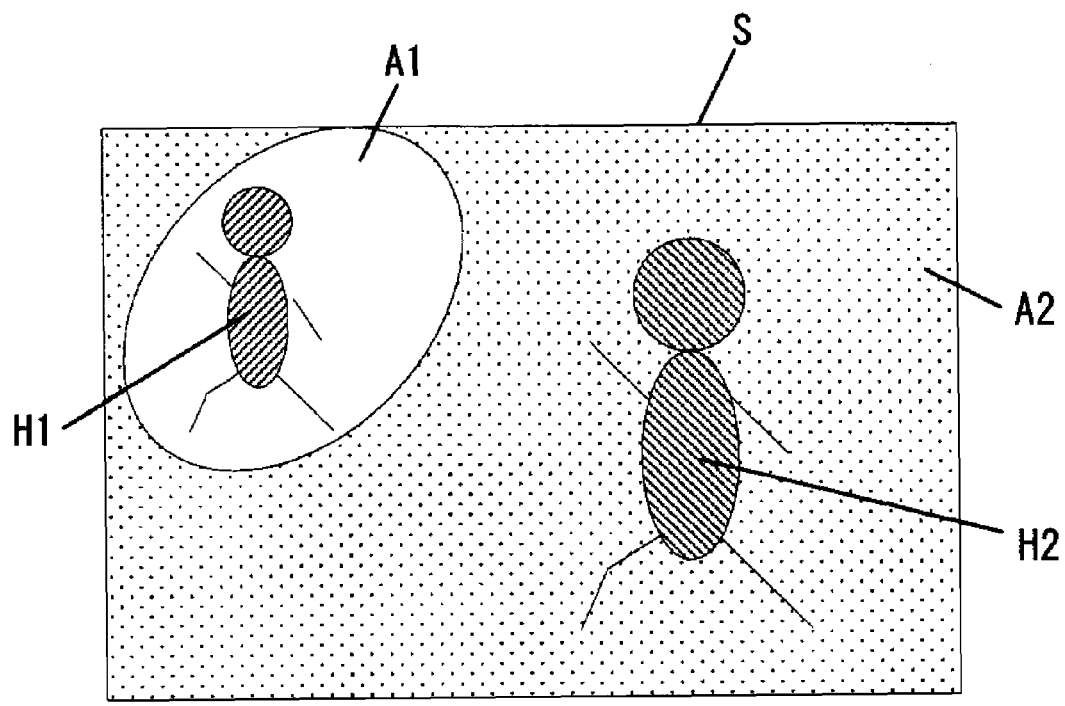
FIG. 2 is a plane view of an object field of the digital camera shown in FIG. 1.
Figure 3:
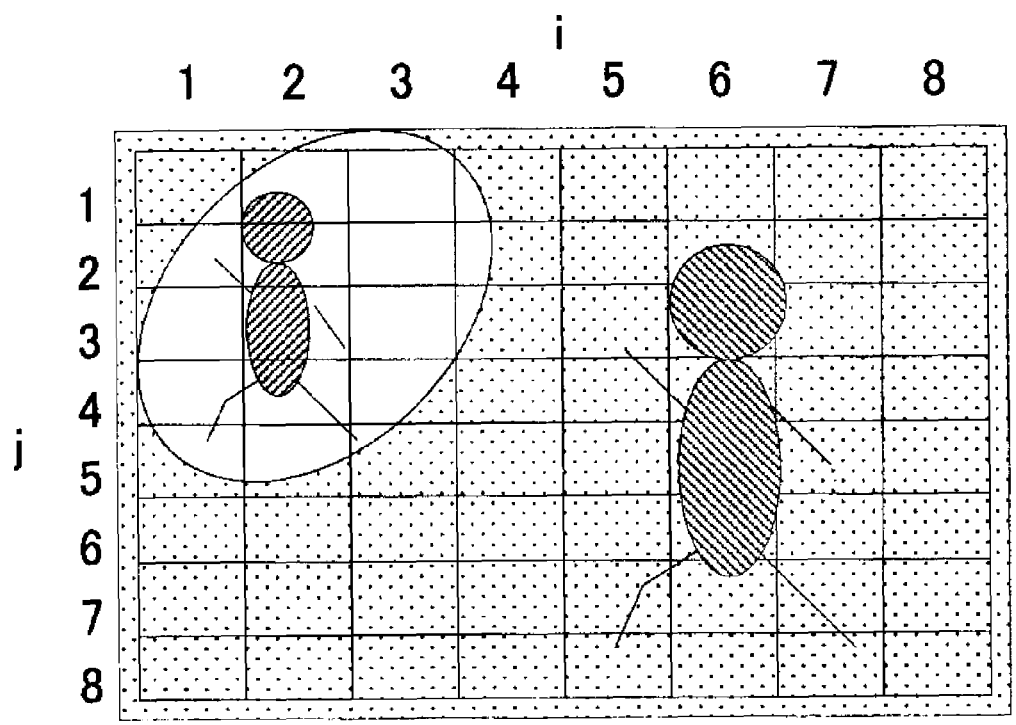
FIG. 3 is a plane view of division regions made by dividing the object field shown in FIG. 2.

Referring now to FIGS. 2 and 3, a description will be given of exposure control over a face (first object) of a human H1 when the face is located at a spotlighted part. FIG. 2 is a schematic view of an object field and an upper left region A1 in the field is a high brightness area that is spotlighted. The region A1 is more brightly irradiated than a region A2 that is not spotlighted around the region A1. The region A2 is a low brightness area that is other than the high brightness region in the object field, and a face (second object) of a human H2 exists on the right side in the field. The human H2 is larger than the human H1.

In calculating a photometric value Yh of the region A1, an object field S shown in FIG. 2 is divided into a plurality of division regions that are expressed by a matrix having a transverse coordinate "i" and a longitudinal coordinate "j," as shown in FIG. 3, and a brightness value Yij is obtained which indicates brightness of each division region per unit area. Reference symbols "i" and "j" satisfy $1 \leq i \leq 8$ and $1 \leq j \leq 8$, respectively, and are parameters indicating a position of each division region. The brightness value of the upper left corner division region has a brightness value of Y11 and the brightness value of the lower right corner division region has a brightness value of Y88. The microcomputer 270 compares this brightness value with a threshold Yth1 and determines that the region is the high brightness region when determining that the brightness value is equal to or higher than the threshold Yth1, as in the Equation 1:

$$Yij \geq Yth1 \quad \text{EQUATION 1}$$

In FIG. 3, division areas having coordinates (i, j) of (2, 1), (3, 1), (1, 2), (2, 2), (3, 2), (1, 3), (2, 3), (3, 3), (1, 4), (2, 4), (3, 4) meet the condition of the Equation 1. Therefore, the region selection unit 270b selects these division regions as first division regions. Next, the region photometric-value generation unit 270c averages brightness values Y21, Y31, Y12, Y22, Y32, Y13, Y23, Y33, Y14, Y24, and Y34 of eleven division regions and generates a photometric value Yh of the region A1 as in the equation below:

$$Yh = \Sigma Yij \text{ (where } i \text{ and } j \text{ are coordinates that satisfy the condition of the Equation 1)} \quad \text{EQUATION 2}$$

Next, the object photometric-value generation unit 270a determines whether a face is detected in the region A1, based on a detection result of the object detection unit 240a of the DSP 240. Initially, the object photometric-value generation unit 270a detects the region A1 utilizing the Equation 1 and the result of the brightness value acquisition unit 240b of the DSP 240, and stores in the memory 250 the coordinate (i, j) of the high brightness region which indicates the position of the division region(s) that satisfy the condition. In addition, the object photometric-value generation unit 270a stores in the memory 250 a coordinate (if, jf) at which the face exists as a face recognition result of the object detection unit 240a exists, and a photometric value Yf of the face per unit area obtained by the brightness value acquisition unit 240b. The object photometric-value generation unit 270a determines that the face exists in the region A1 when determining that the existence coordinate of the face stored in the memory 250 accords with the region A1 stored in the memory 250. Otherwise, the object photometric-value generation unit 270a determines that no face exists in the high brightness region.

FIG. 3 shows the humans H1 and H2 in the object field with both faces recognized. Assume that the face of the human H2 has a photometric value Yf1 at an existence coordinate (6, 3) and the face of the human H1 has a photometric value Yf2 at an existence coordinate (2, 2). When the existence coordinates of these two faces are compared with the coordinate of the region A1 stored in the memory 250, only the existence coordinate (2, 2) of the face of the human H1 matches. In other words, a face of one person is recognized in the high recognition region and a face of another person is recognized in the low brightness region.

Here, the exposure-control photometric-value generation unit 270d generates a photometric value Yt used for the exposure control utilizing the above face recognition result and the following equation. Here, assume that Yh is the photometric value of the region A1, as discussed above, and k1 and k2 are a numerator and a denominator of a coefficient, Nh is an emphasis ratio of the photometric value of the region A1, and N1 is an emphasis ratio of the photometric value of the face in the region A1.

$$Yt = (k1/k2) \times ((Yh \times Nh + Yf1 \times N1))/(Nh + N1) \quad \text{EQUATION 3}$$

Thus, the face of the human H1 in the region A1 can be photographed with proper exposure using the photometric value of the face of the human H1 recognized in the region A1 but without using the photometric value of the face recognized in the region A2.

Figure 4:
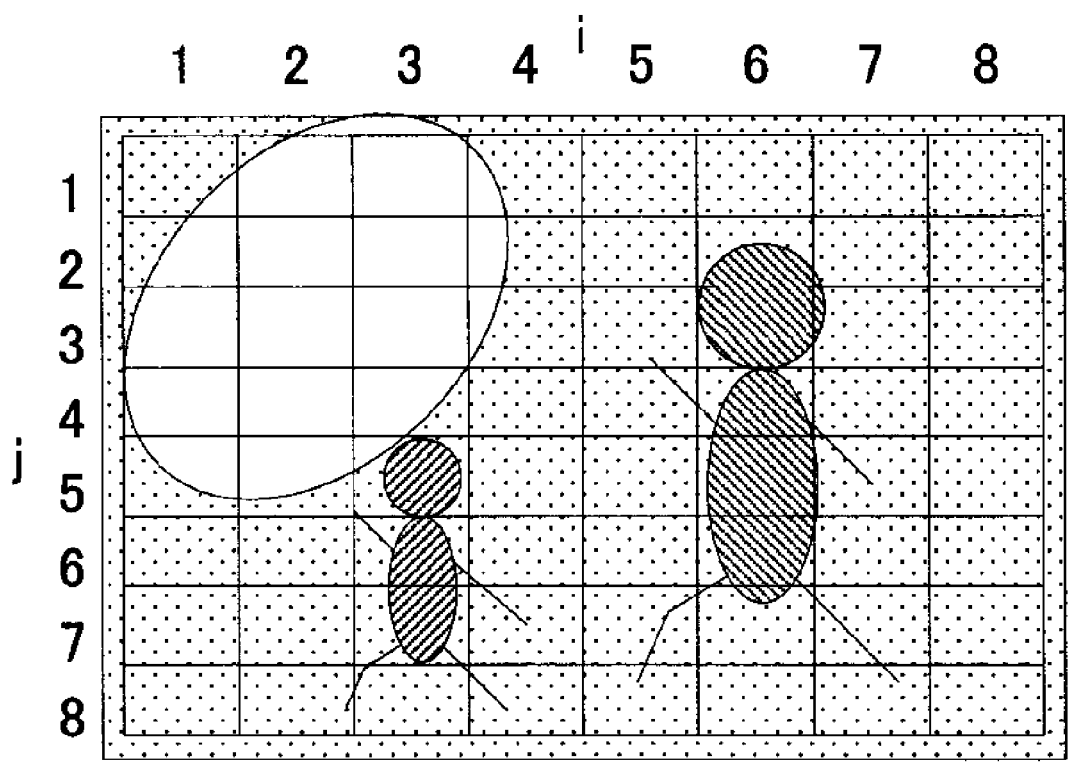
FIG. 4 is a plane view showing that a face becomes unrecognized in the high brightness area of the object field shown in FIG. 3.

Referring now to FIG. 4, a description will be given of exposure control over the face that has been recognized in the region A1 but becomes unrecognized due to a human action, a movement of the spotlight, etc. When the face that has been recognized in the high brightness region disappears, the photometric value used for the exposure control is expressed as follows:

$$Yt = (k1/k2) \times Yh \quad \text{EQUATION 4}$$

As soon as the face disappears in the high brightness region, the Equation 3 may be immediately shifted to the Equation 4 but the face may again appear in the high brightness region. Thus, when the face disappears in the high brightness region with the exposure control based on the result of the Equation 3 the exposure control follows based on a result of the Equation 5 until a predetermined time period T elapses after the face disappears in the high brightness region. When the face disappears in the high brightness region, a photometric value Yf1' of the lastly recognized face in the high brightness region is stored in the memory 250 and used for a calculation.

$$Yt=(k1/k2) \times ((Yh \times Nh + Yf1' \times N1))/(Nh+N1) \quad \text{EQUATION 5}$$

When the face is again recognized in the high brightness region before the time period T elapses after the recognized face disappears in the high brightness region, the exposure control is performed using the photometric value of the recognized face and the result of the Equation 3. When the face remains unrecognized in the high brightness region when the time period T elapses after the recognized face disappears from the high brightness region, the exposure control is performed based on the photometric value of the high brightness region of the Equation 4. This control can provides stable exposure control when the object becomes undetected after the object has been detected in the motion image photography, because the exposure does not change abruptly and significantly.

If the face remains unrecognized in the high brightness region after the time period T elapses, the face recognition is performed in the low brightness region and the exposure control may be performed based on the Equation 6 and a photometric value Yf3 of the face of the recognition result, in order to emphasize the face detection result and to stabilize the exposure.

When a plurality of faces recognized in the low brightness region, a face closest to the high brightness region is highly likely to be the face that has so far been used for the exposure control and thus the photometric value of the face closest to the high brightness region may be reflected more for the exposure control.

When there are a plurality of recognized faces in the low brightness region, the exposure control may be performed without reflecting a photometric value of a face other than the face closest to the high brightness region.

$$Yt=(k1/k2) \times ((Yh \times Nh + Yf3 \times N1))/(Nh+N1) \quad \text{EQUATION 6}$$

When the face is again recognized in the high brightness region from the exposure control state based on the Equation 6, the exposure control may be performed using the photometric value Yf1 of the face in the high brightness region and the Equation 3. In this case, the Equation 6 is switched to the Equation 3 after the time period T elapses after the face is again recognized in the high brightness region. Thereby, the exposure control becomes stable. When the face is not recognized both in the high brightness region and in the low brightness region, the photometric value of the high brightness region is for the exposure control based on the Equation 4. Even in this case, after the time period T elapses, the Equation 6 is switched to the Equation 4.

As described above, in the exposure control over the high brightness region in the object field, this embodiment provides exposure control using a photometric value of a high brightness region in the object field and a photometric value of an object detected in the high brightness region in the object field. This configuration effectuates proper exposure of the high brightness region in the object field. In addition, when the object becomes undetected after the object has been detected in the high brightness region in the object field in the motion image photography, the photometric value of the object just before the object becomes undetected is continuously used for a predetermined time period for the exposure control so as to stabilize the exposure control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-296245, filed Nov. 20, 2008, which is hereby incorporated by reference herein in its entirety.

What is claimed is:

1. An image pickup apparatus comprising:
   an image pickup device configured to convert incident light from a lens into an electric signal;
   an object detection unit configured to detect an object by extracting a characteristic point of an image based on an output of the image pickup device;
   a brightness value acquisition unit configured to obtain a brightness value of each division region of an object field that is divided into a plurality of division regions;
   an object photometric-value generation unit configured to generate a photometric value of the object from information of the object detected by the object detection unit and the brightness value of each division region obtained by the brightness acquisition unit;
   a region selection unit configured to select a high brightness region having a brightness value equal to or higher than a threshold in the object field; and
   an exposure-control photometric-value generation unit configured to generate the photometric value used for an exposure control from a photometric value of the object generated by the object photometric-value generation unit and a photometric value of the high brightness region generated by a region photometric-value generation unit,
   wherein when the object detection unit detects a first object in the high brightness region, and a second object in a low brightness region that is lower in brightness than the high brightness region and other than the high brightness region, the exposure-control photometric-value generation unit uses the photometric value of the high brightness region generated by the region photometric-value generation unit and the photometric value of the first object generated by the object photometric-value generation unit to generate the photometric value used for the exposure control but without using the photometric value of the second object generated by the object photometric-value generation unit.

2. The image pickup apparatus according to claim 1, further comprising a timer configured to measure a set time period,
   wherein when the first object disappears in the high brightness region but the second object remains detected in the low brightness region after the object detection unit recognizes the first object in the high brightness region, the exposure-control photometric-value generation unit generates the photometric value used for the exposure control by using the photometric value of the high brightness region generated by the region photometric-value generation unit and the photometric value of the first object that has been lastly recognized, which has been generated by the object photometric-value generation unit but without using the photometric value of the second object generated by the object photometric-value generation unit, until the timer measures the set time period after the first object disappears in the high brightness region.

3. The image pickup apparatus according to claim 2, wherein when the first object disappears in the high brightness region but the second object remains detected in the low brightness region after the object detection unit recognizes the first object in the high brightness region, the exposure-control photometric-value generation unit generates the photometric value used for the exposure control by using the photometric value of the high brightness region generated by the region photometric-value generation unit but without using the photometric value of the second object generated by the object photometric-value generation unit, after the timer measures the set time period after the first object disappears in the high brightness region.

4. The image pickup apparatus according to claim 3, wherein after the first object disappears in the high brightness region and the object detection unit again recognizes the first object in the high brightness region, the exposure-control photometric-value generation unit generates the photometric value used for the exposure control that has been so far generated by the region photometric-value generation unit until the timer measures the set time period after the first object is recognized in the high brightness region.

5. The image pickup apparatus according to claim 2, wherein when the first object disappears in the high brightness region but the second object remains detected in the low brightness region after the object detection unit recognizes the first object in the high brightness region, the exposure-control photometric-value generation unit generates the photometric value used for the exposure control by using the photometric value of the high brightness region generated by the region photometric-value generation unit and the photometric value of the second object generated by the object photometric-value generation unit, after the timer measures the set time period after the first object disappears in the high brightness region.

6. A control method of an image pickup apparatus, said method comprising:
an object detecting step of detecting an object by extracting a characteristic point of an image based on an output of an image pickup device of the image pickup apparatus;
a brightness value acquisition step of obtaining a brightness value of each division region of an object field that is divided into a plurality of division regions;
an object photometric-value generating step of generating a photometric value of the object from information of the object detected by the object detecting step and the brightness value of each division region obtained by the brightness acquisition step;
a region selecting step of selecting a high brightness region having a brightness value equal to or higher than a threshold in the object field; and
an exposure-control photometric-value generating step of generating a photometric value used for an exposure control from the photometric value of the object generated by the object photometric-value generating step and a photometric value of the high brightness region generated by a region photometric-value generating step,
wherein when the object detecting step detects a first object in the high brightness region, and a second object in a low brightness region that is lower in brightness than the high brightness region and other than the high brightness region, the exposure-control photometric-value generating step uses the photometric value of the high brightness region generated by the region photometric-value generating step and the photometric value of the first object generated by the object photometric-value generating step to generate the photometric value used for the exposure control without using the photometric value of the second object generated by the object photometric-value generating step.

7. The control method according to claim 6, further comprising a time measuring step of measuring a set time period, wherein when the first object disappears in the high brightness region but the second object remains detected in the low brightness region after the object detecting step recognizes the first object in the high brightness region, the exposure-control photometric-value generating step generates the photometric value used for the exposure control by using the photometric value of the high brightness region generated by the region photometric-value generating step and the photometric value of the first object that has been lastly recognized, which has been generated by the object photometric-value generating step but without using the photometric value of the second object generated by the object photometric-value generating step, until the time measuring step measures the set time period after the first object disappears in the high brightness region.

8. The control method according to claim 7, wherein when the first object disappears in the high brightness region but the second object remains detected in the low brightness region after the object detecting step recognizes the first object in the high brightness region, the exposure-control photometric-value generating step generates the photometric value used for the exposure control by using the photometric value of the high brightness region generated by the region photometric-value generating step but without using the photometric value of the second object generated by the object photometric-value generating step, after the time measuring step measures the set time period after the first object disappears in the high brightness region.

9. The control method according to claim 8, wherein after the first object disappears in the high brightness region and the object detecting step again recognizes the first object in the high brightness region, the exposure-control photometric-value generating step generates the photometric value used for the exposure control that has been so far generated by the region photometric-value generating step until the time measuring step measures the set time period after the first object is recognized in the high brightness region.

10. The control method according to claim 7, wherein when the first object disappears in the high brightness region but the second object remains detected in the low brightness region after the object detecting step recognizes the first object in the high brightness region, the exposure-control photometric-value generating step generates the photometric value used for the exposure control by using the photometric value of the high brightness region generated by the region photometric-value generating step and the photometric value of the second object generated by the object photometric-value generating step, after the time measuring step measures the set time period after the first object disappears in the high brightness region.

11. An image pickup apparatus comprising:
an image pickup device configured to convert incident light into an electrical signal;
an object detection unit configured to detect an object in an object field based on an output of the image pickup device;

a calculation unit configured to calculate a photometric value based on a plurality of photometric results obtained from a plurality of photometric areas in the object field; and an exposure control unit configured to perform an exposure control based on the photometric value calculated by the calculation unit, wherein the calculation unit determines a weight for a photometric result of the object detected by the object detection unit based on a brightness value in an area where there is the object detected by the object detection unit, and calculates the photometric value used for the exposure control, wherein when the plurality of objects is detected by the object detection unit, the calculation unit determines a weight for the photoelectric result of a first object detected by the object detection unit that is in an area where the brightness value in the object field is equal to or higher than a threshold is relatively made larger than a weight for the photometric result of a second object detected by the object detection unit that is in an area where the brightness value in the object field is lower than the threshold.

12. An image pickup apparatus comprising:

an image pickup device configured to convert incident light into an electrical signal;

an object detection unit configured to detect an object in an object field based on an output of the image pickup device;

a calculation unit configured to calculate a photometric value based on a plurality of photometric results obtained from a plurality of photometric areas in the object field; and an exposure control unit configured to perform an exposure control based on the photometric value calculated by the calculation unit, wherein the calculation unit determines a weight for a photometric result of the object detected by the object detection unit based on a brightness value in an area where there is the object detected by the object detection unit, and calculates the photometric value used for the exposure control, wherein the calculation unit determines the weight when the brightness value in the area where there is the object detected by the object detection unit is a first value, so as to be larger than that when the brightness value in the area where there is the object detected by the object detection unit is a second value smaller than the first value, wherein when the object detected by the object detection unit is in an area where the brightness value in the object field is equal to or higher than a threshold, the calculation unit calculates the photometric value used for the exposure control based on the photometric result in the area where the brightness value in the object field is equal to or higher than the threshold and the photometric result of the object detected by the object detection unit, and when the object detected by the object detection unit is in an area where the brightness value in the object field is lower than the threshold, the calculation unit calculates the photometric value used for the exposure control based on the photometric result in the area where the brightness value in the object field is equal to or higher than the threshold without using the photometric result of the object detected by the object detection unit.

13. The image pickup apparatus according to claim 12, wherein the object detection unit detects a face in the object field.

14. A control method of an image pickup apparatus, said method comprising:

an object detecting step of detecting an object in an object field based on an output of an image pickup device of the image pickup apparatus;

a calculating step of calculating a photometric value based on a plurality of photometric results obtained from a plurality of photometric areas in the object field; and an exposure controlling step of performing an exposure control based on the photometric value calculated by the calculating step, wherein the calculating step determines a weight for a photometric result of the object detected by the object detecting step based on a brightness value in an area where there is the object detected by the object detecting step, and calculates the photometric value used for the exposure control, wherein when the plurality of objects is detected by the object detecting step, the calculating step determines a weight for the photoelectric result of a first object detected by the object detecting step that is in an area where the brightness value in the object field is equal to or higher than a threshold is relatively made larger than a weight for the photometric result of a second object detected by the object detecting step that is in an area where the brightness value in the object field is lower than the threshold.

15. A control method of an image pickup apparatus, said method comprising:

an object detecting step of detecting an object in an object field based on an output of an image pickup device of the image pickup apparatus;

a calculating step of calculating a photometric value based on a plurality of photometric results obtained from a plurality of photometric areas in the object field; and an exposure controlling step of performing an exposure control based on the photometric value calculated by the calculating step, wherein the calculating step determines a weight for a photometric result of the object detected by the object detecting step based on a brightness value in an area where there is the object detected by the object detecting step, and calculates the photometric value used for the exposure control, wherein the calculating step determines the weight when the brightness value in the area where there is the object detected by the object detecting step is a first value, so as to be larger than that when the brightness value in the area where there is the object detecting step is a second value smaller than the first value, wherein when the object detected by the object detecting step is in an area where the brightness value in the object field is equal to or higher than a threshold, the calculating step calculates the photometric value used for the exposure control based on the photometric result in the area where the brightness value in the object field is equal to or higher than the threshold and the photometric result of the object detected by the object detecting step, and when the object detected by the object detecting step is in an area where the brightness value in the object field is lower than the threshold, the calculating step calculates the photometric value used for the exposure control based on the photometric result in the area where the brightness value in the object field is equal to or higher than the threshold without using the photometric result of the object detected by the object detecting step.

16. The control method of the image pickup apparatus according to claim 15, wherein the object detection step detects a face in the object field.

* * * * *